Figure 7:
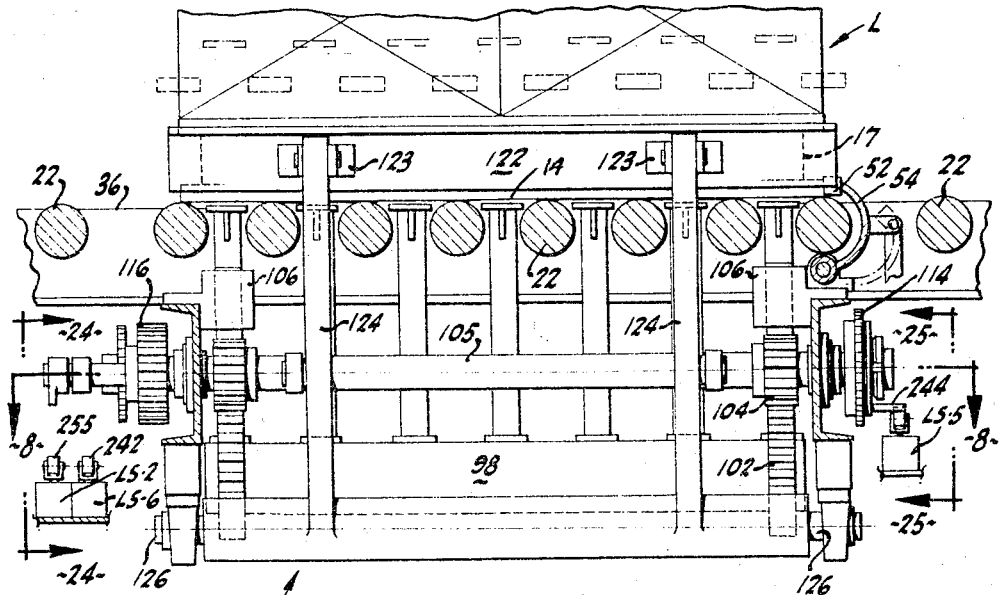

Aug. 30, 1966     J. H. KEMP, JR     3,269,565
APPARATUS FOR TRANSFERRING PALLETIZED LOADS
Filed July 23, 1965                    14 Sheets-Sheet 1
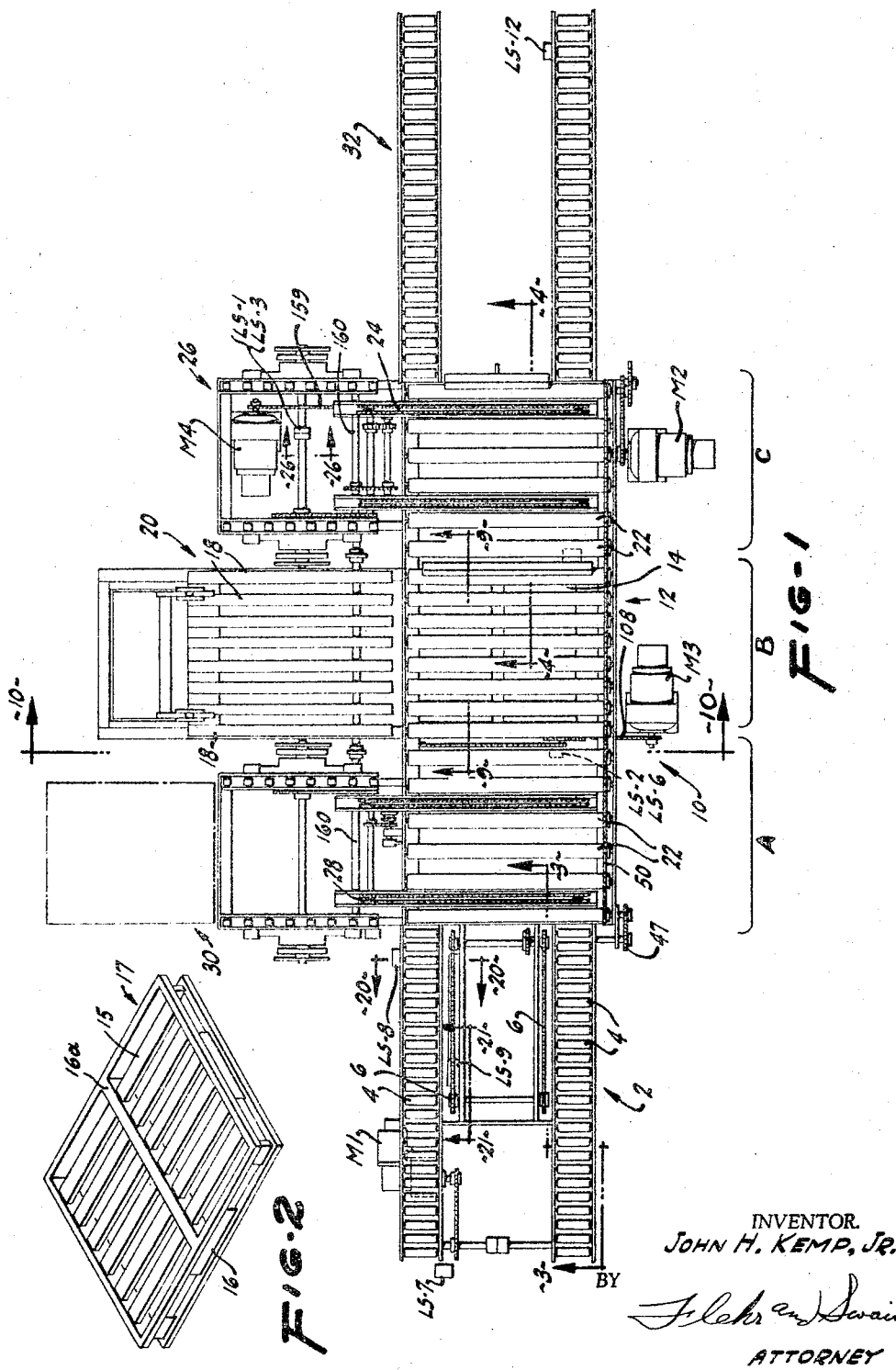
INVENTOR.
JOHN H. KEMP, JR.
BY
ATTORNEY

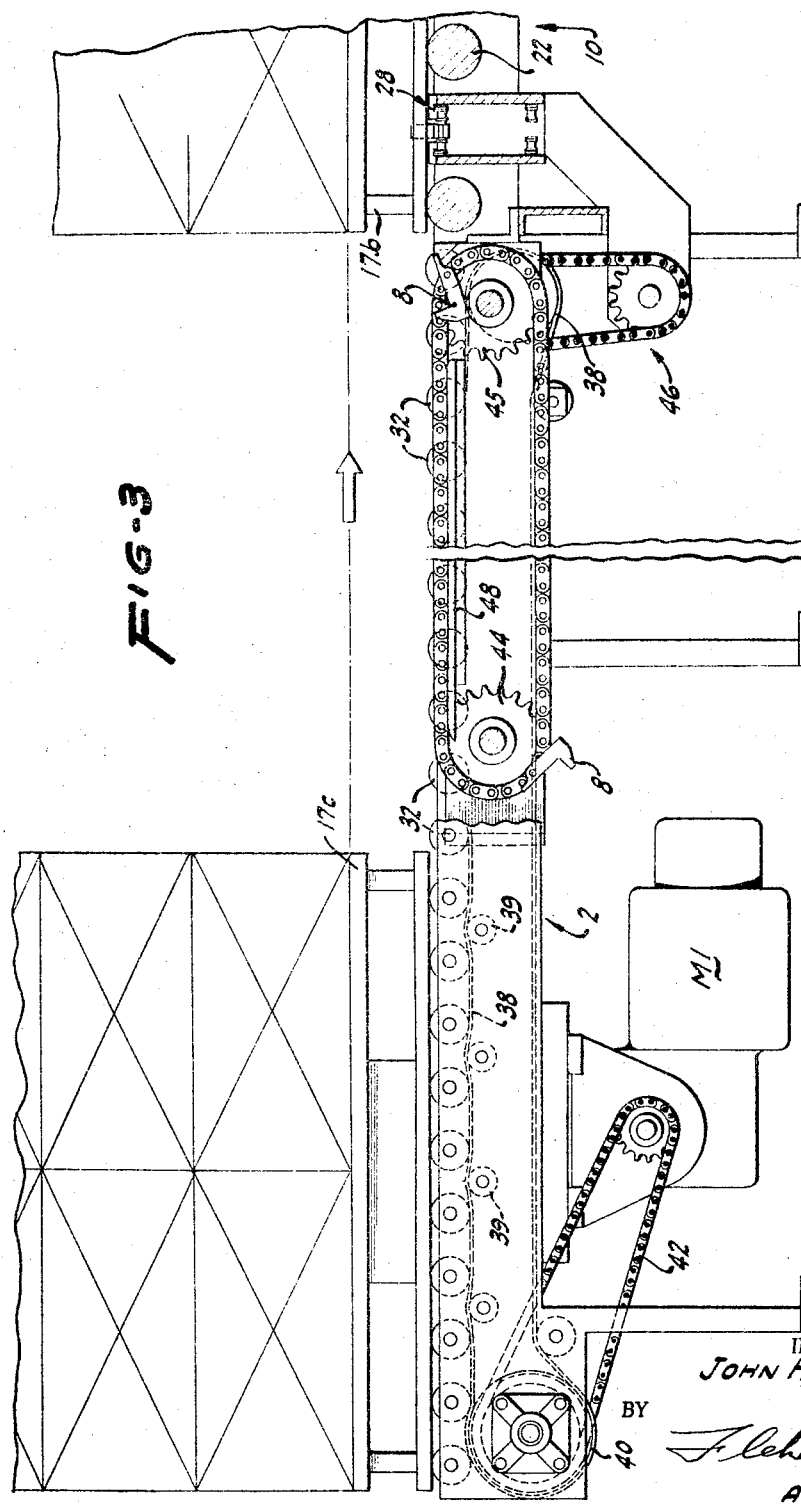

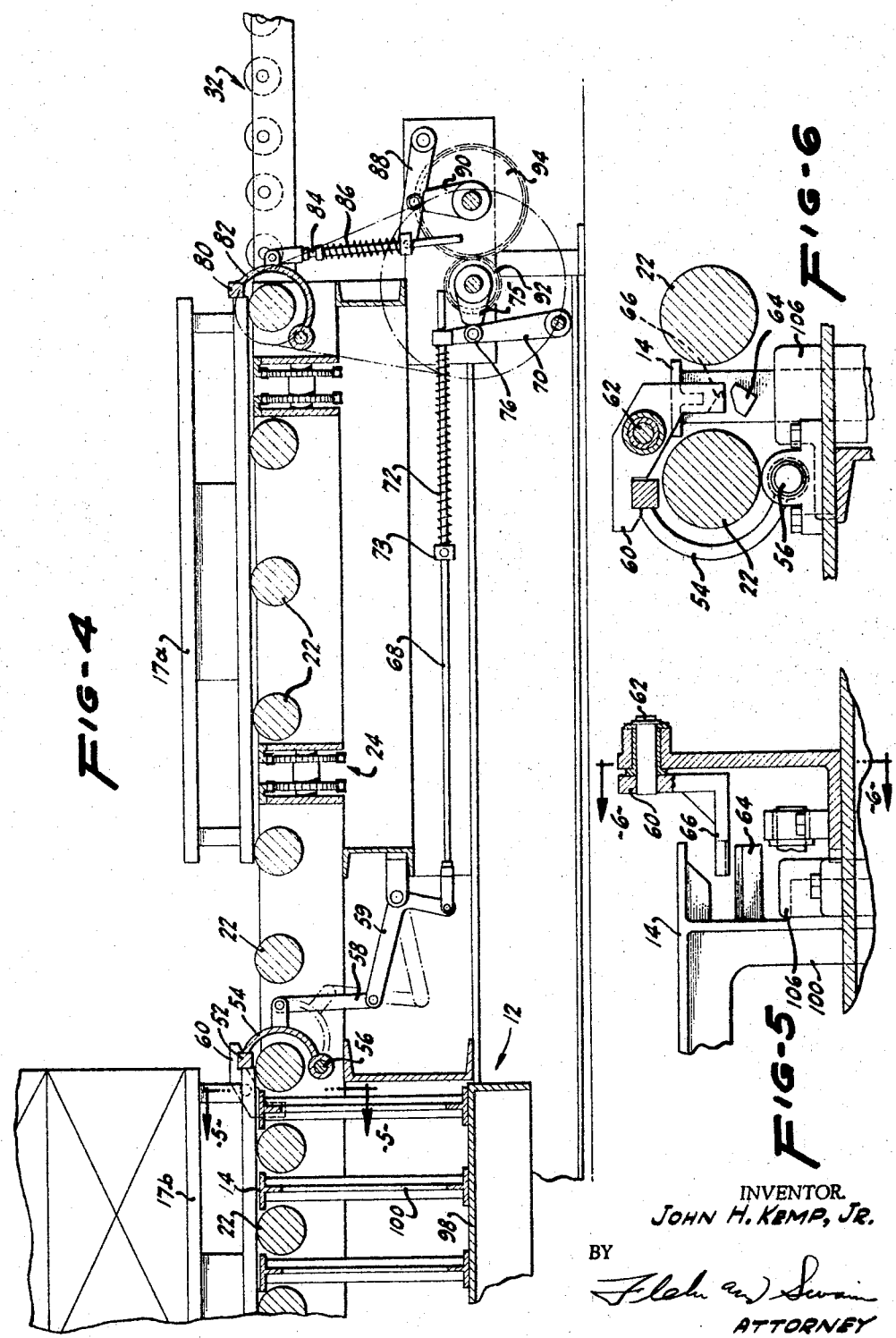

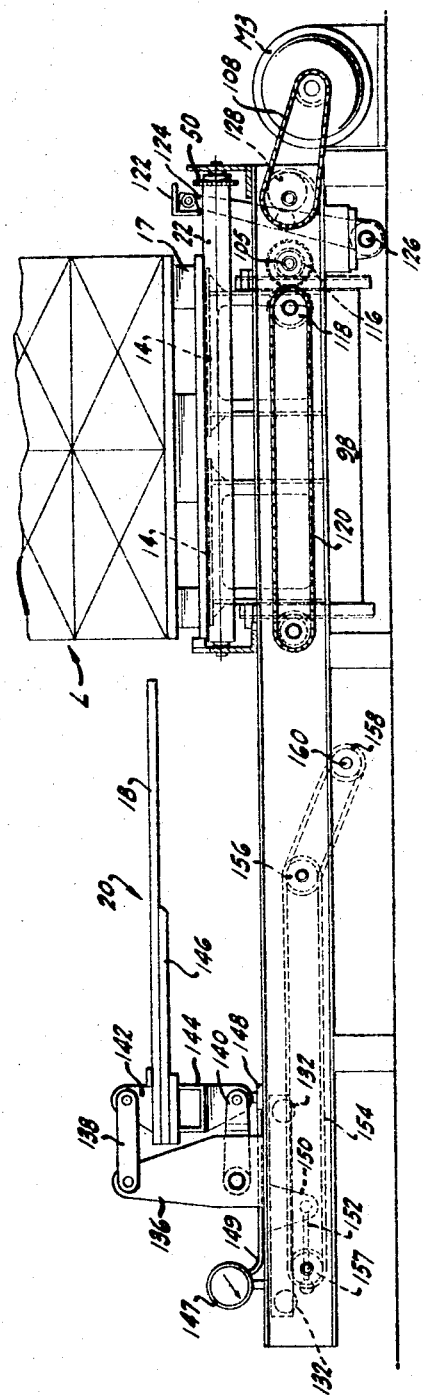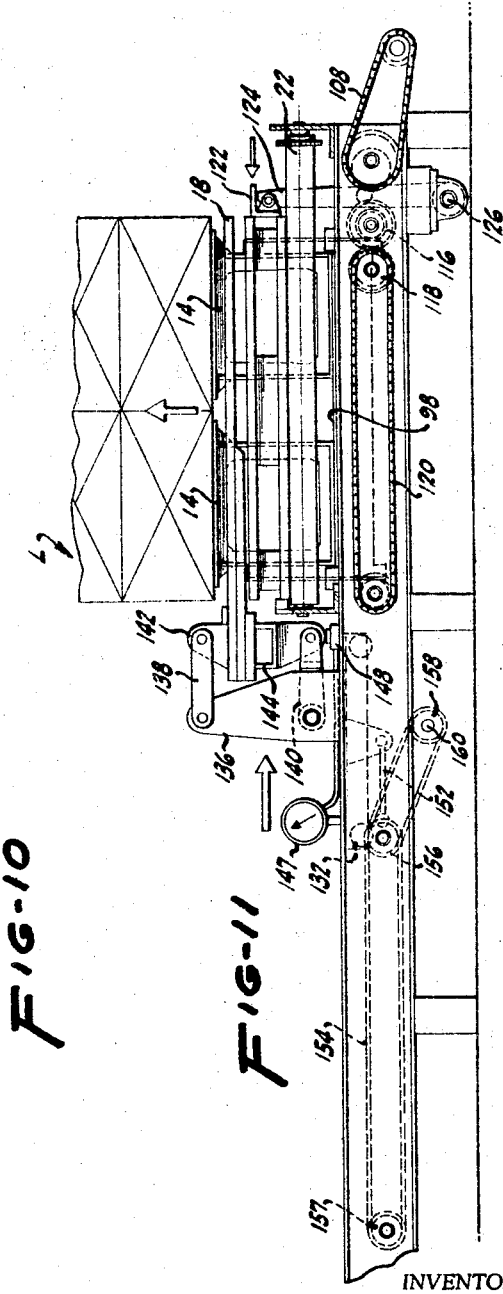

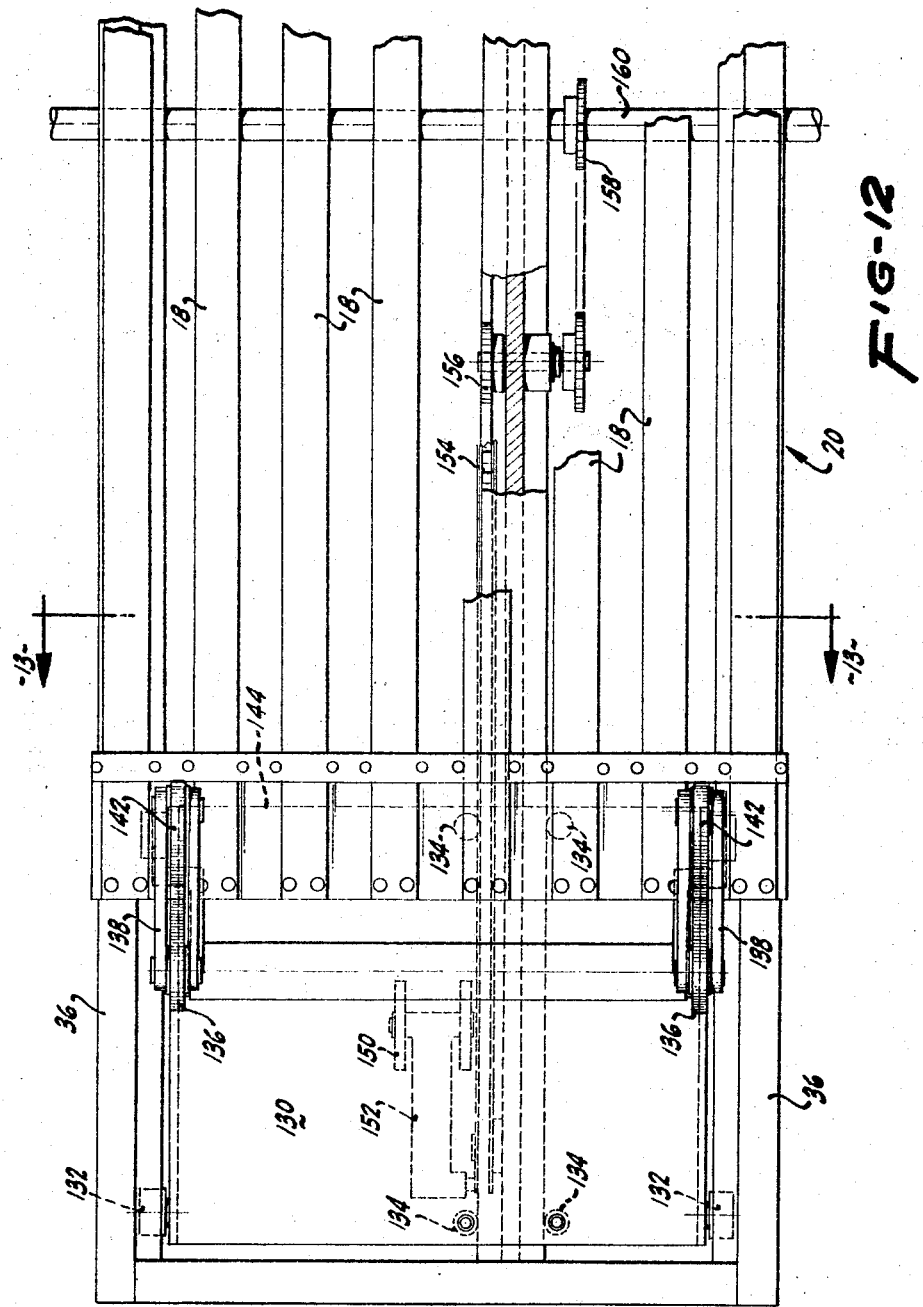

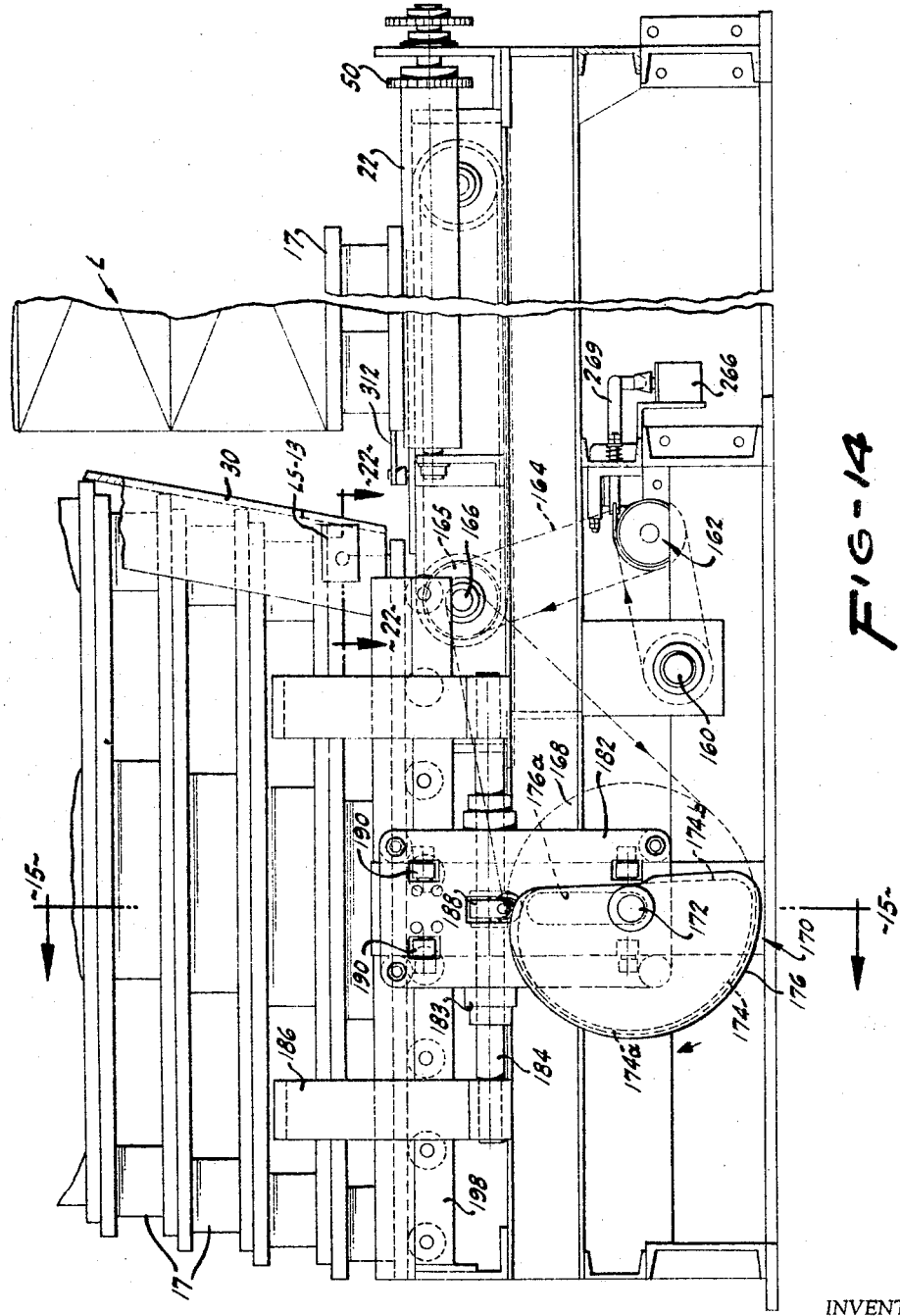

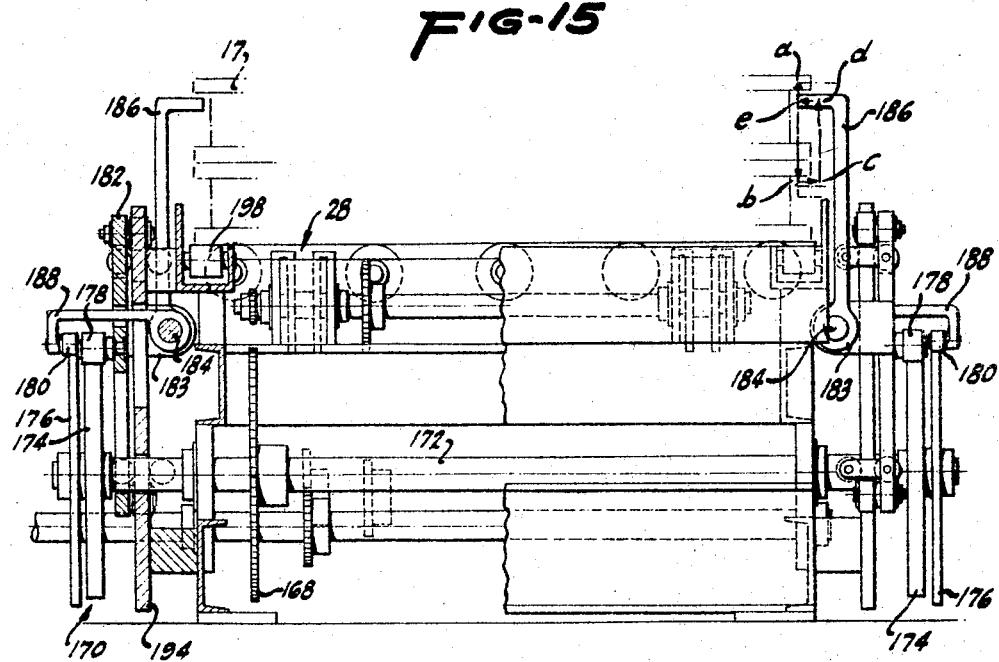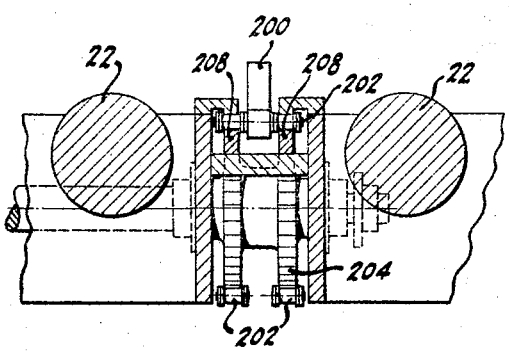

Aug. 30, 1966 J. H. KEMP, JR 3,269,565
APPARATUS FOR TRANSFERRING PALLETIZED LOADS
Filed July 23, 1965 14 Sheets-Sheet 10
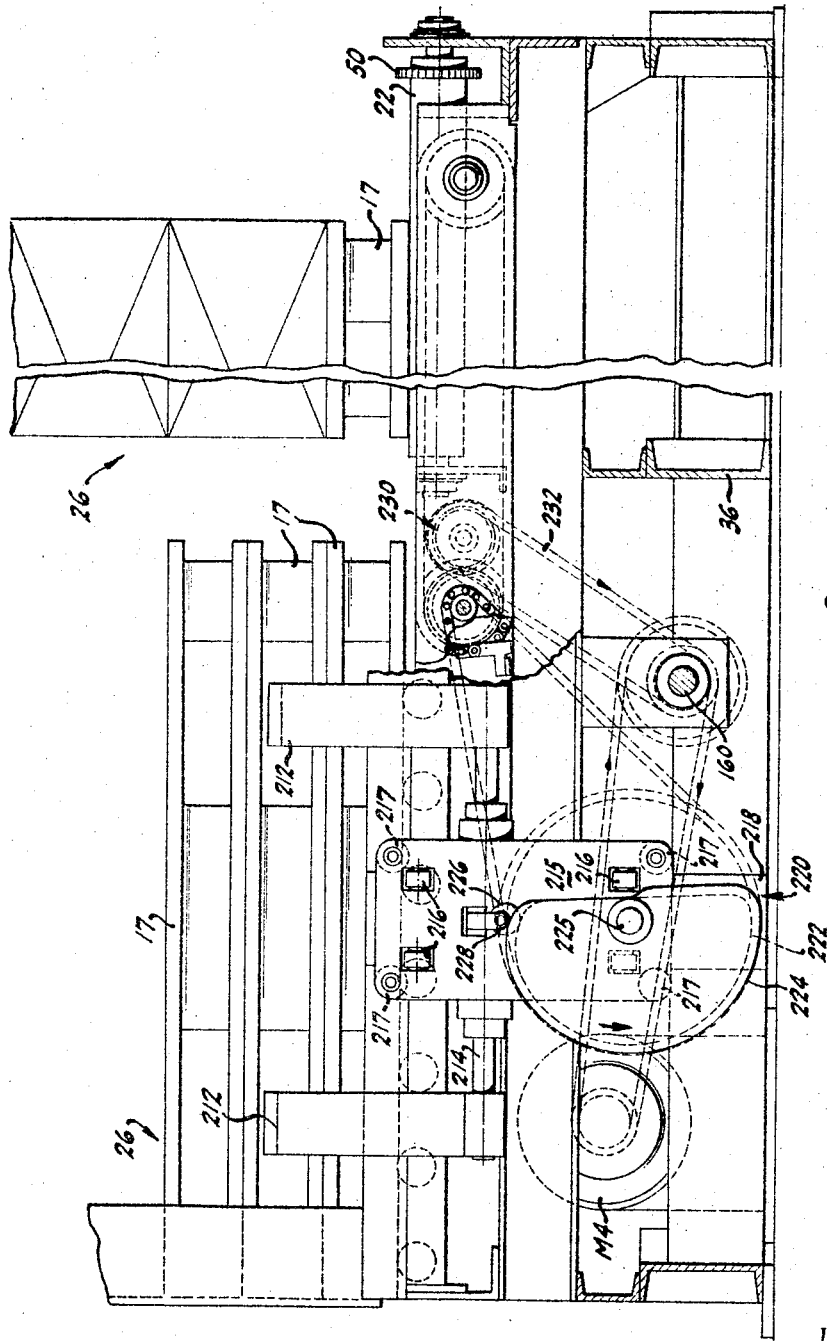
INVENTOR.
JOHN H. KEMP, JR.
BY
ATTORNEY

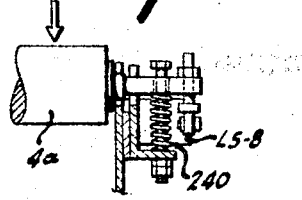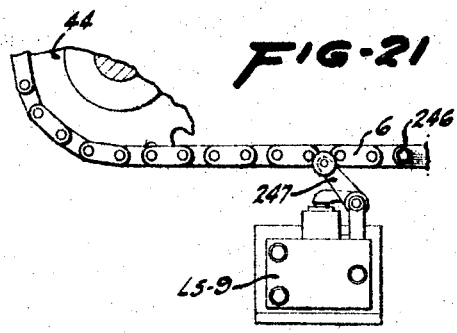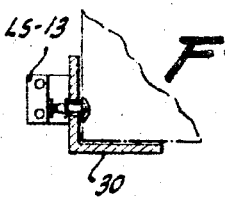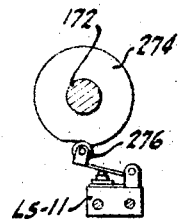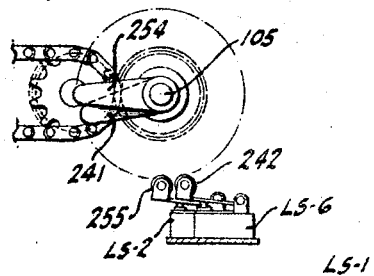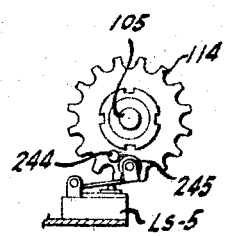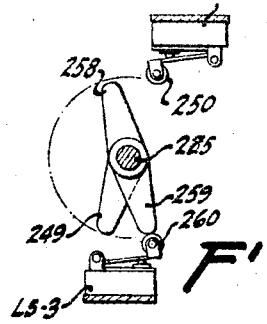

INVENTOR.
JOHN H. KEMP, JR.
BY
ATTORNEY

United States Patent Office 3,269,565
Patented August 30, 1966

3,269,565
APPARATUS FOR TRANSFERRING PALLETIZED LOADS
John H. Kemp, Jr., 140 Greenoaks Drive, Atherton, Calif.
Filed July 23, 1965, Ser. No. 474,350
19 Claims. (Cl. 214—2)

This application is a continuation-in-part of my application Ser. No. 111,882, filed March 28, 1961 (now Patent No. 3,151,754), Ser. No. 155,394, filed November 28, 1961 (now abandoned) and my copending application Ser. No. 216,100 filed August 10, 1962, now abandoned. The invention relates to apparatus for transferring palletized loads and, more particularly, to a machine for transferring a load from a pallet on which it is delivered to a replacement pallet.

Generally, when loads are shipped on pallets there is no convenient way for the loads to be removed from the pallets at the time of delivery while the shipper's truck or boxcar is available to receive the pallets for return. It is not convenient for the receiver of palletized loads to save unloaded pallets for the shipper, and generally speaking, the initial or replacement cost of the pallets does not justify the expense involved in shipping them specially. Consequently, the pallets on which loads are shipped are generally considered expendable and, over a period of time, the purchase or manufacture of pallets for shipping a product may constitute a considerable cost item.

It is therefore an object of this invention to provide a machine that will quickly and efficiently transfer palletized loads from one pallet to another pallet.

It is a further object of this invention to provide a machine for removing loads from an incoming pallet, exchanging a pallet with a replacement pallet delivered from a supply thereof and delivering the original incoming pallet for immediate return to the truck or boxcar on which it arrives.

It is a further object of this invention to provide a machine for transferring palletized loads which includes means adapted to engage under the load uniformly and lift it without upsetting it.

It is a further object of this invention to provide apparatus for transferring a load from one pallet to another and weighing the load during the course of the transfer.

It is a further object of this invention to provide a machine for transferring loads which traverses one path to be delivered empty to a magazine in which they are stacked, and the replacement pallet follow a separate path, to be delivered from a magazine in which they are stacked to a receiving station for further shipping or distribution.

In carrying out this invention there is provided a conveyor line that passes through a transfer or exchange station. The pallets conducted along the conveyor line are of a type having slots or other suitable openings therein through which lift fingers of an elevator disposed below the conveyor line may pass. Positioning means on the conveyor lines stops the pallet in the proper transfer position, the lift fingers rise until they pass through the pallet and engage and lift the loads free thereof. Then, a transfer fork having a plurality of tines is extended horizontally to pass between the elevator lift fingers so as to be disposed between the load and the pallet from which it was removed. Then, the elevator is again lowered until the load is supported on the transfer fork and the lift fingers are then retracted from the pallet slots, so that the pallet is free to move along the conveyor. A weighing mechanism may be incorporated with the transfer fork to weigh the load while a new pallet is being moved in to replace the original. In this operation, a pallet unstacking mechanism feeds a pallet one at a time from a supply, and the shipper's pallet is moved from the table while the replacement pallet is moved in place at the transfer or exchange station. When the replacement pallet is properly positioned, the lift fingers are again raised to pass through the slots of the replacement pallet and move up past the times of the transfer fork to remove the load therefrom, freeing the transfer fork to remove the load therefrom, freeing the transfer fork to be retracted out from under the load. Finally, the lift fingers are again lowered to replace the load on the replacement pallet and are then withdrawn through the slots of the replacement pallet to free it for removal to a delivery station, thus completing the transfer.

Figure 8:
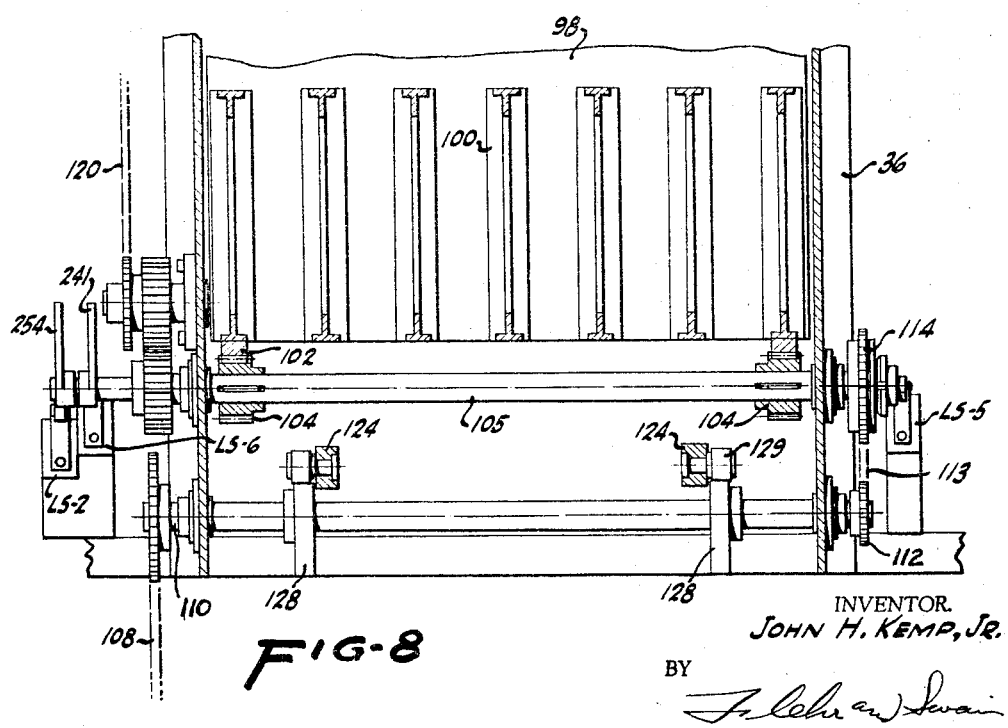
Figure 9:
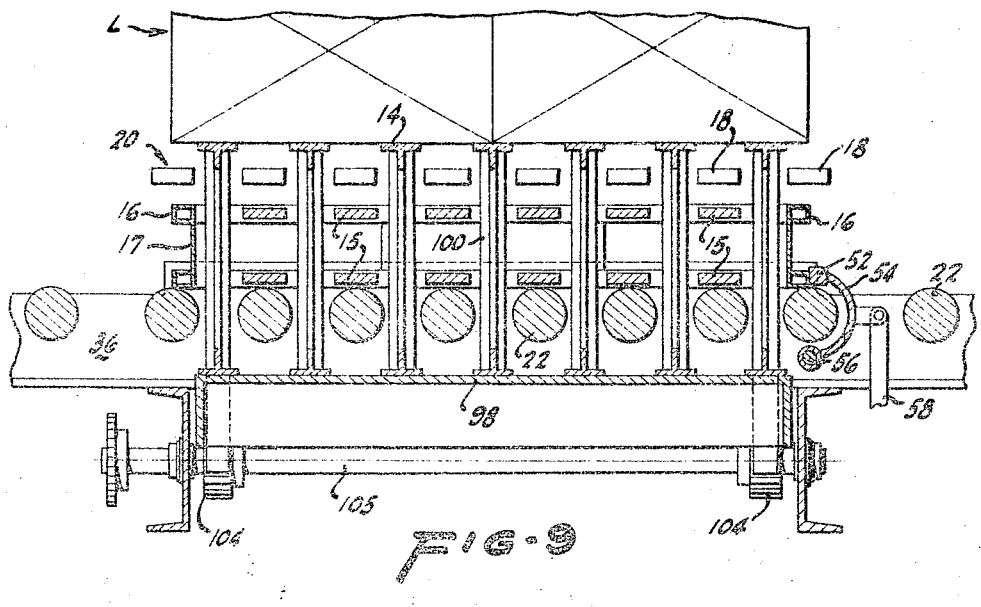
Figure 13:
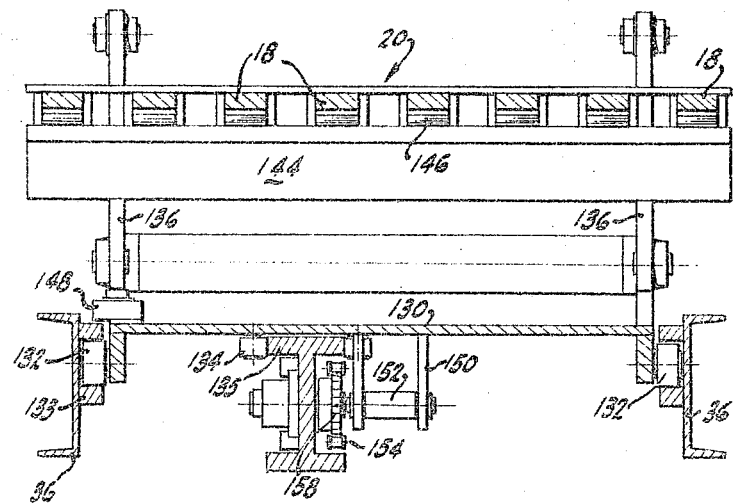
Figure 19:
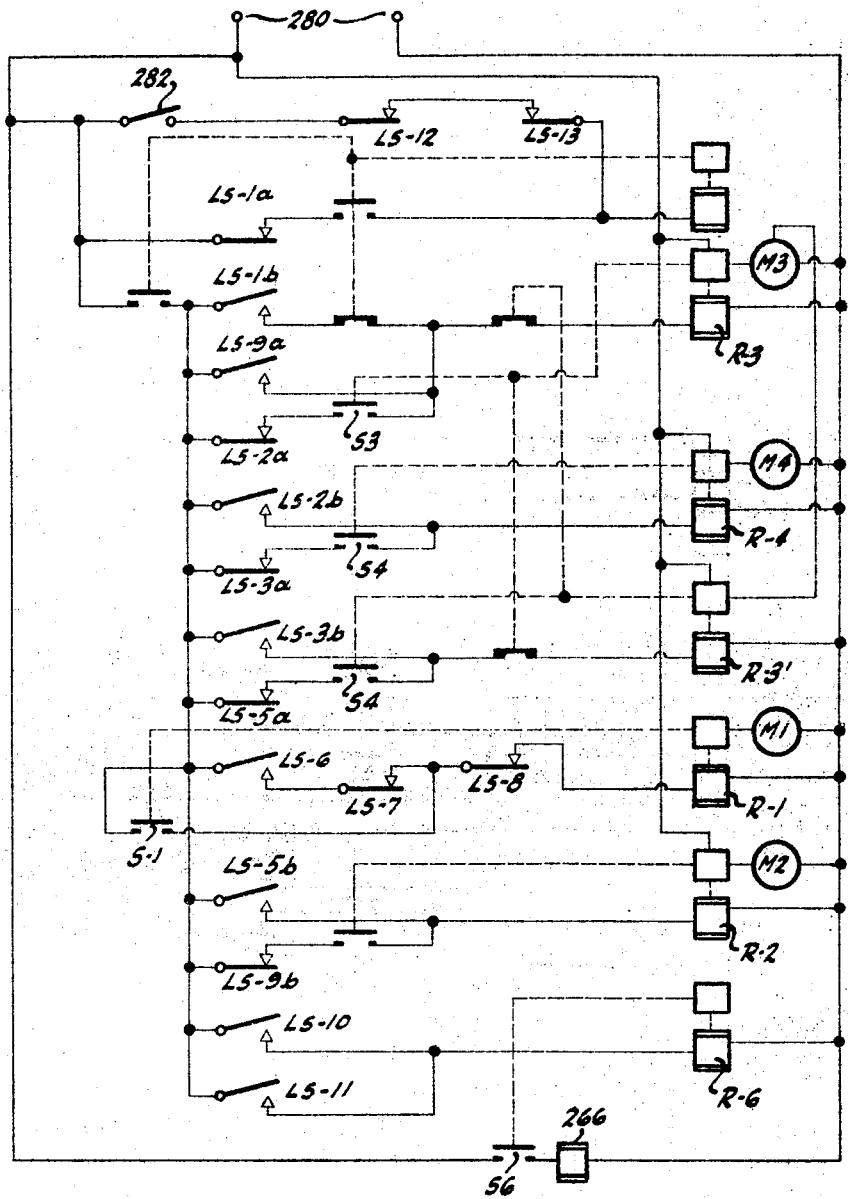
Figure 27:
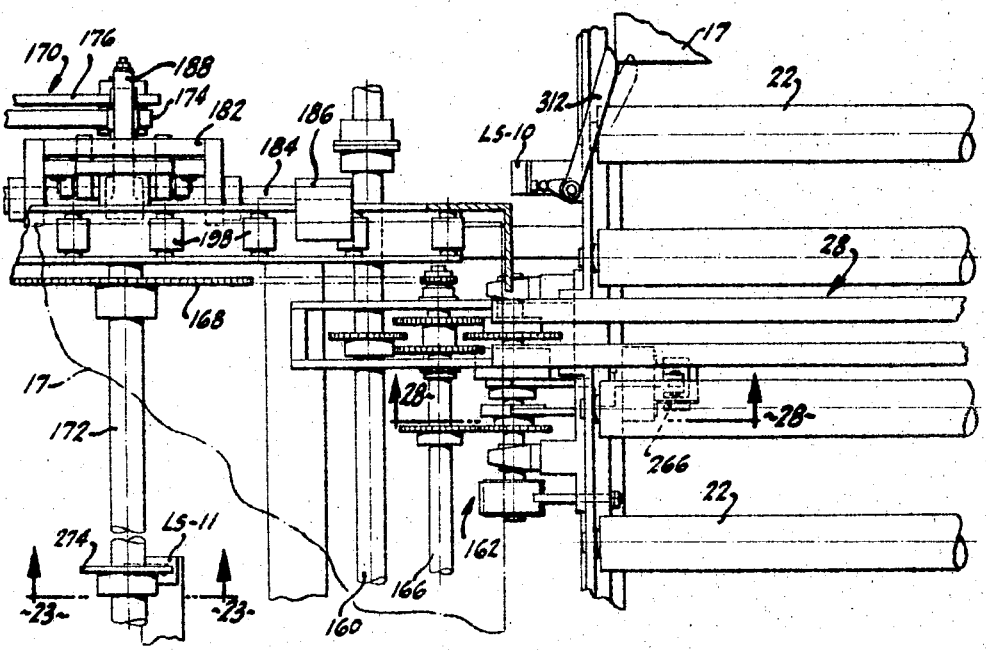
Figure 28:
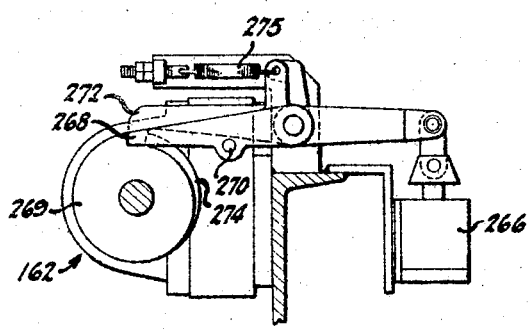
Figure 29:
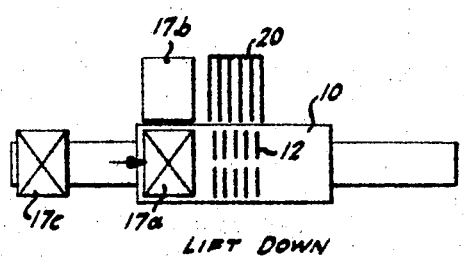

These and other objects of this invention will become apparent from the specification following when read in conjunction with the accompanying drawings wherein:

FIG. 1 is a plan view of a machine for transferring palletized loads embodying features of this invention;
FIG. 2 is an isometric view of a pallet especially adapted for use with the machine of FIG. 1;
FIG. 3 is a view partially in section taken along line 3—3 of FIG. 1;
FIG. 4 is a section view taken along line 4—4 of FIG. 1;
FIG. 5 is a partial section view taken along line 5—5 of FIG. 4;
FIG. 6 is a section view taken along line 6—6 of FIG. 5;
FIG. 7 is a front view partially in section of the elevator mechanism comprising a part of this invention;
FIG. 8 is a section view taken along line 8—8 of FIG. 7;
FIG. 9 is a section view along line 9—9 of FIG. 1 showing the relationship between the lift elevator and the transfer fork;
FIG. 10 is a section view taken along line 10—10 of FIG. 1 showing the transfer fork in retracted position;
FIG. 11 is a side view similar to FIG. 10 showing the transfer fork in extended position;
FIG. 12 is a top partial view partially in section of the transfer fork mechanism;
FIG. 13 is a section view taken along line 13—13 of FIG. 12;
FIG. 14 is a side view showing the pallet unstacking mechanism;
FIG. 15 is a section view taken along line 15—15 of FIG. 14;
FIG. 16 is a section view of a transfer conveyor feed mechanism;
FIG. 17 is a partial section view of the conveyor mechanism of FIG. 16;
FIG. 18 is a side view of the pallet stacking mechanism;
FIG. 19 is a circuit diagram of electrical components that control the sequence of operation;
FIG. 20 is a partial section view taken along line 20—20 of FIG. 1;
FIG. 21 is a partial view of incoming chain taken along line 21—21 of FIG. 1;
FIG. 22 is a partial section view taken along line 22—22 of FIG. 14;
FIG. 23 is a partial section view taken along line 23—23 of FIG. 27;
FIG. 24 is a partial section view taken along line 24—24 of FIG. 7;
FIG. 25 is a partial section view taken along line 25—25 of FIG. 7;
FIG. 26 is a partial section view taken along line 26—26 of FIG. 1;
FIG. 27 is a partial top view of the pallet unstacking feeding mechanism;
FIG. 28 is a section view taken along line 28—28 of FIG. 27; and FIGS. 29 to 36 are schematic illustrations of the method of transferring loads comprising a part of this invention.

Now, referring to the drawings in greater detail, and particularly to FIG. 1, the load transfer machine of this invention includes a feed conveyor 2 on which loaded pallets are received. The feed conveyor 2 includes rollers 4 which are driven by a motor M1 to convey loaded pallets. From the feed conveyor positive feed conveyor chains 6 with feed dogs 8 (see FIG. 3), deliver the loaded pallets to the main conveyor 10 at the central section of the machine. The main conveyor includes the alined incoming exchange and feed sections A, B and C. Section B provides what may be termed an exchange station. At the exchange section B the loaded pallet is placed and held stationary over a lift or elevator assembly 12 having a series of spaced lift fingers 14 which pass upward between the spaced slats 15 carried in the frame 16 of a pallet 17 (FIG. 2) to lift the load from the pallet. With the load thus raised above the pallet, the tines 18 of a transfer fork assembly 20 may be extended to pass between the lift fingers 14 and beneath the load where they are in position to support the load while the lift fingers are lowered and the pallet on which the load was received is removed and replaced by another.

The unloaded pallet is then moved by the conveyor rollers 22 to the conveyor section C and transverse conveyor 24 which delivers it to a pallet stacking assembly 26. The pallet on which the load is placed after removal from the incoming pallet is delivered to the incoming section A of the main conveyor by a transverse conveyor 28 which brings it from a pallet unstacking assembly 30 and from thence the incoming pallet is delivered to section B and the exchange station.

After the load is transferred to the replacement pallet it is moved along the delivery conveyor 32.

*Feed conveyor*

As shown in FIG. 3, a loaded pallet 17c is delivered to the machine on the feed conveyor 2. This may comprise a series of conveyor rollers 4 journaled in the frame of the machine 36 and driven by frictional engagement of a belt 38 urged against the conveyor rollers 4 by tension rollers 39. The friction driving belt 38 is driven by any suitable means such as the drive cylinder 40 journaled in the end of the frame 36 and driven by the conveyor motor M1 through any suitable drive medium, such as a chain 42. The rotating conveyor rollers impart a positive drive to the pallet 17c in the direction of the arrow until they are moved to the positive feed conveyor chain 6 carrying feed dogs 8.

The positive feed conveyor chains 6 are driven in timed relation to the operation of elements the main conveyor 12 as will hereinafter be described. The chains 6 are extended between idler sprocket 44 and drive sprockets 45 which, in turn, are driven from the drive of the main conveyor by means of chain drive 46 and chain drive 47 (FIG. 1) connecting it to the main conveyor drive. As each feed dog 8 moves over the idler sprocket 44 it engages a cam bar 48 which holds it in operative position to engage the trailing edge of a pallet and move it along to the conveyor rolls 22 of the main conveyor 10 which are driven by a chain drive 50. During each machine cycle, the positive feed chain moves through a half cycle so that each feed dog is carried between the positions shown in FIG. 3. That is, the feed dog engages the trailing edge of a pallet to deliver it to the transfer table and the other feed dog returns to the starting position.

*Pallet positioning mechanism*

Referring now to FIGS. 4, 5 and 6, the proper position of a pallet on the main conveyor 10 is defined by a stop 52 carried on a pivotable arm 54 which swings it up into the path of the pallet's leading edge as it is delivered onto the table. The stop arm 54 is pivoted on the machine at 56 and is swung upwardly by a linkage including a link 58 and a bell crank lever 59.

When the stop is swung into active position, it cams under a locking latch 60 pivoted on the machine at 62 to drop into the position shown in FIGS. 4 and 6, gripping the stop 52 securely against displacement. In FIGS. 5 and 6 there is shown a release mechanism for the latch 60 comprising a cam member 64 carried on one of the lift fingers 14 of the elevator mechanism 12. When the elevator descends to its retracted position below the rollers 22, the cam member 64 engages an extension 66 on the latch arm 60 to release it from engagement. With the latch so released the stop arm 54 is free to drop out of the path of the pallet 13 permitting it to be moved along the main conveyor.

The mechanism for raising the stop arm 54 comprises a rod 68 pivotally connected to the bell crank lever 59 at one end and slidably received in a pivotable arm 70 at the other. A spring 72 carried on the rod 68 between its connection with the arm 70 and a collar 73 provides a yieldable motion transmitting member which when compressed by counterclockwise pivotal movement of the arm 70 urges the rod 68 to the left in FIG. 1 to pivot the bell crank lever clockwise and raise the stop arm 54.

Counterclockwise movement of the arm 70 is accomplished by means of a cam 75 having a short high dwell which acts against a roller follower 76 carried on the arm 70 forcing it momentarily to the left to compress the spring 72.

When the arm 70 is disposed toward the right in FIG. 4 the spring 72 is released and, with the stop member 52 unlatched, movement of the pallet against it will swing the arm 54 downward out of its path.

Operated in timed relation to the stop member 52 is another stop 80 which engages the leading edge of an emptied pallet as it reaches the transverse conveyor 24 which carries it to the stacking mechanism. The stop 80 is carried on an arm 82 which is operated by a spring loaded rod 84 which is driven upward when a spring 86 is compressed by pivotal movement of an arm 88 actuated by a cam 90.

It will be noted that the cams 75 and 90 are mechanically connected by gears 92 and 94 so that cam 75 rotates twice during each revolution of cam 94. During each complete cycle of operation the first stop 52 must be operated twice, first to index the incoming loaded pallet, and then to position the empty replacement pallet so that the load may be replaced properly. During this same cycle, the second stop need be operated only once, to index the empty pallet from which the load was removed and position it on the transverse conveyor 24.

*Lift mechanism*

Referring now to FIGS. 7, 8 and 9, the lift mechanism 12 comprises a platform 98 slidably mounted in the frame 36 of the machine for vertical reciprocatory movement. Supported on the platform 98 is a plurality of vertical lift supported frames 100 the horizontal top surface of which forms the load supporting fingers 14. The lift support frames 100 are spaced along the elevator platform 98 at proper intervals to pass freely between the transfer table feed rolls 22 and the slats 15 of the pallet 17 (FIGS. 2 and 9). As shown in FIG. 1, where the pallet 17 includes a central cross brace 16a the lift frames 100 are interrupted to form two aligned series of lift fingers or members 14, each adapted to extend between the slats on one side of the pallet cross brace 16a.

The means for raising and lowering the platform 98 comprises a pair of racks 102 on each side of the platform, only one side being shown in FIGS. 7 and 8. The racks 102 are driven by pinions 104 keyed onto a shaft 105 and are constrained to travel a vertical path by suitable slideway retainers 106. Thus rotation of the pinions 104 produce vertical movement of the racks 102 and hence the platform 98 and lift fingers 14. The shaft 105 and pinions 104 are driven in opposite directions by reversible motor M3 (FIG. 1) in a manner hereinafter to be described, through chain 103, shaft 110, sprocket 112, chain 113 and sprocket 114. The rotation of pinion shaft 105 is transmitted to the pinions on the other side of the elevator 98 by suitable gear means 116 and 118 and the sprocket and chain 120.

Before the elevator 98 is lifted, a jogging bar 122 secured on brackets 123 carried by a pair of upstanding arms 124 pivotally mounted on the machine at 126 is swung forwardly to engage the pallet and insure that it is in proper position transverse of the conveyor rollers. This jogging operation is accomplished by a pair of rotary cams 128 (FIG. 8) mounted on the shaft 110 to operate a pair of cam roller followers 129 each carried on one of the arms 124.

As the elevator 98 is raised with the pallet in proper position defined by the stop 52, the lift fingers 14 move upward between the rolls of the conveyor 22 and between the slats 15 of the pallet 17 to lift the load L free of the pallet for the purpose of introducing the tines 18 of the transfer fork 20 (FIG. 9) in a manner now to be described. During this upward movement the cam member 64 on the elevator 12 (FIGS. 5 and 6) pivots the latch 60 and stop 54 idly, with the motion being absorbed in the spring 72.

*Transfer fork*

Referring now to FIGS. 9 to 13, when the load on the pallet is raised above the surface of the pallet to the position shown in FIGS. 9 and 11, the tines 18 of transfer fork 20 are extended beneath the load in order to support the load when the elevator is thereafter retracted from between the pallet slats 15 so that a different pallet may be exchanged for that one which originally supported the load. The transfer fork mechanism includes a carriage 130 (FIG. 13) which has supporting wheels 132 thereon which roll along a channel ways 133 secured to the inner side of the machine frame 36 and guide rollers 134 which roll along a guide plate 135 also on the frame. A pair of brackets 136 extend upwardly from the carriage plate 130, each to support parallel arms 138 and 140 which in turn pivotally support the fork mounting bracket 142. Extending between the fork mounting brackets 142 is a box beam 144 to which are secured reinforcing fingers 146 and the fork tines themselves 18. As shown most clearly in FIG. 9, the fork tines are spaced substantially the same as are the slats 15 of the pallet so that when the carriage 130 is extended to the position shown in FIG. 11, the tines will overlay the slats and pass between adjacent elevator lift frames 100. Then if the lift fingers 14 are retracted downwardly, it will be apparent that the load will settle onto the fork tines to be supported thereby and that with the lift fingers completely retracted from the slots of the pallet, the pallet may be removed and replaced. The parallel linkage 138, 140 by means of which the fork tines 18 are supported permit the load to be weighed as it is supported thereon. For this purpose there is provided a suitable weighing mechanism such as a scale 147 operated hydraulically in a conventional manner under fluid pressure induced by the weight of the load L acting through the linkage 138, 140 against a hydraulic piston 148 with attached flexible conduits 149, the entire assembly being mounted on the carriage 130. Of course, the weighting mechanism 147, 148 is merely shown schematically and it is obvious that the particular type of weighing device employed is a matter of engineering choice. The significant thing is that as the load L is supported on the tines 18, the linkage 138, 140 causes it to act against the weighing mechanism actuator 148 so that the load L is weighed without in any way interfering with the pallet transfer operation, thus eliminating a separate time and labor consuming operation. Since the tines 18 support the load L directly, without the pallet, the scale 147 will reflect the net weight of the goods, assuming of course that allowance for the weight of the fork assembly 20 itself has been made in calibrating the scale 147.

It is also obvious that devices other than the fork assembly 20 may be used for supporting the elevated load. If a weighing mechanism is included then allowance must be made for the weight of the pallet. However, net weight may also be measured by interposing a scale mechanism into the elevator assembly 12. This may be accomplished, for example, by providing a movable scale on the platform 98 (FIG. 9) which may be unlocked and hence operated when the elevator reaches the top of its stroke, and locked while rising and descending.

The preferred means for reciprocating the elevator assembly carriage 130 comprises a pair of depending brackets 150 pivotally carrying a connecting rod 152 which is pivotally connected at its other end to a chain 154 driven by sprockets 156 and 157, the sprocket 156 being in turn driven by a belt or chain from a driving sprocket 158 carried on shaft 160 driven by motor M4 (FIG. 1). Thus as shown in FIGS. 10 and 11, the carriage 130 reciprocates toward and away from the main conveyor 10 and the lift mechanism 12 during a complete cycle of operation as the connecting rod 152 traverses the run of the chain 154. The timing is such that the fork tines 18 extend between the elevator frame member 100 when the lift fingers 14 are extended, and the tines remain extended as the lift fingers are retracted downward, the pallets are transferred and the elevator lift fingers are again extended to support the load. At this point the connecting rod 152 traverses the return run of the chain 154 to retract the fork. The means for effecting this operation in timed sequence will be described hereinafter.

*Pallet unstacking and stacking assemblies*

When a loaded pallet is placed on the transfer table 10 to have the load removed therefrom, an empty pallet is positioned to be moved into its place after it is removed. The pallet unstacking assembly where this is accomplished is shown in FIGS. 14 and 15. There the drive shaft 160 is driven by the same motor M4 that drives the transfer fork mechanism 20 so that the fork and the unstacking device operate concurrently. A clutch 162 to be described hereinafter is interposed in the drive train so that the unstacking mechanism is driven through a single cycle of operation with start and stop conditions closely controlled. From the clutch 162 a chain 164 drives sprocket 165, and sprocket 166 on the same shaft drives large sprocket 168 to rotate composite control cam 170 keyed therewith on the shaft 172.

Referring to FIG. 15 it will be noted that a composite cam 170 is mounted on each end of the shaft 172 and each comprises a vertical motion-controlling disc 174 and a horizontal motion-controlling disc 176, each controlling movement of a roller follower 178 and 180, respectively. The follower 178 is pivotally mounted in a vertically slidable carriage 182 to which are secured bearing brackets 183 rotatably supporting a shaft 184. To each shaft 184 are keyed two or more upright pallet support arms 186 and a generally horizontal cam follower arm 188 rotatably carrying the cam follower roller 180 so that the arms 186 and 188 together form a bell crank lever.

As the vertical control follower 178 traverses the cam disc 174 the slide 182 is raised and lowered in accordance with high and low dwells 174a and 174b of the cam 174. It will also be seen from FIG. 14 that the cam 176 is concentric with the cam 174 except along a portion of the low dwell 176a. Thus for most of the cam cycle the followers 178 and 180 move up and down in unison but in the portion 176a the horizontal control follower 180 moves down relative to follower 178 and the bell crank is pivoted counterclockwise to swing the pallet support arm 18.

The chain is driven by sprocket 204 on shaft 166

(FIG. 14) and hence in timed relation to the composite cam 170 controlling the pallet support arms 186. As the pallet is released by the arms 186 a feed dog is cammed into operative position by cam bar 208 so that a pallet 17 is pulled across the transfer table 10. Near the end of its travel, the feed dog 200 falls from the trailing end of the cam bar 209 to drop free of the pallet to the position shown in phantom in FIG. 16 so that the pallet may be fed by the transfer table rollers 22. As will be further discussed hereinafter, the feed dog 200 moves in unison with the transfer fork 20 and moves through its feeding stroke along the upper run of the chain 202 as the fork 20 moves into extended position. As the fork is withdrawn the dog moves idly along the bottom run of the chain 202.

As has been described in connection with FIG. 4, as the newly unloaded pallet is moved toward the right end of the main conveyor 10 its leading edge is engaged by the second pallet stop 80 which swings upwardly above the conveyor rollers 50 to prevent further movement longitudinal of the table 10. At this point the feed dog of the second transverse conveyor 24 engages the pallet to move it transversely toward the magazine 26 in which the pallets are stacked. The second transverse conveyor 24 operates identically to that shown in FIG. 14 except that it is reversed and feeds toward the magazine 26. Additionally, the single dog on the chain is disposed to move through the active stroke during withdrawal of the transfer fork 20.' Since the pallet enters the magazine 26 from the bottom it is necessary to lift pallets already in the magazine so that the incoming pallet may be inserted under them. This is accomplished as shown in FIG. 18, by means of pallet stacking fingers 212 similar in construction to the pallet unstacking fingers 186 previously described. The stacking fingers 212 are secured onto a shaft 214 for oscillatory movement into and out of active position engaging under the edges of the pallet frames 16. The shaft 214 is rotatably mounted in a carriage 215 which is mounted on rollers 216 and 217 for vertical movement along guideway 218 secured to the frame 36. Thus the fingers 212 can move pivotally into and out of engagement with the pallets and vertically with the carriage 215 to engage pallets at different levels. The particular paths followed by the stacking fingers 182 is the reverse of that followed by the unstacking fingers, as illustrated in FIG. 15. Specifically, the stacking fingers start in their fully elevated inward position at point *a* holding the stack of pallets at a sufficient height to permit the second transverse conveyor 24 to deliver the newly-unloaded pallet underneath the stack. Then the fingers move downward to point *e* until the stack of pallets settles onto the newly-placed pallet, then outward to point *d* to clear the edges of the pallets, downward below the level of the edge of the lower pallet to point *c*, inward to point *b* to engage under the edge of the bottom pallet and then upward to its initial position at point *a*, preparing the stack for delivery of the next pallet.

The means for producing this motion comprises the composite cam 220 including two cam discs 222 and 224 rotated with shaft 225 and traversed by cam followers 226 and 228, respectively. Again the cam 222 produces vertical movement of the pallet stacking arms 212 and the cam 224 pivots them outwardly. The profile of the composite cam 220 is the same as that of composite cam 170 in FIG. 14 but it is rotated in the opposite direction to produce the reverse cycle. Here again cam 220 is driven from common shaft 160 in turn driven from motor M4, but a gear connection 230 reverses the direction of rotation imparted by chain 232.

*Control of machine sequence*

Referring again to FIG. 1, the feed conveyor 2 is driven by the motor M1 through the chain drive 42 while the positive feed conveyor chain 6 and the main conveyor rollers 22 are driven by motor M2 through chain drives 49, 50 and 47. A separate motor M3 is connected by chain drive 108 to operate the lift mechanism, and a fourth motor M4 is connected by chain drive 159 to drive a common shaft 160 from which the unstacking conveyor 28, the stacking conveyor 24 and the transfer fork mechanism 20 are all driven. In conjunction with the four motors and drive mechanisms, there is provided a series of safety devices and automatic controls which will now be described.

As shown in the wiring diagram of FIG. 19 the circuit of the motor M1 driving the feed conveyor includes a normally open limit switch LS6 and two normally closed limit switches LS7 and LS8. Referring to FIG. 1, a normally closed limit switch LS7 is provided at the incoming end of the machine and is adapted to be engaged by the lift truck placing the pallet on the conveyor to open the M1 motor circuit and insure that the feed conveyor C is stationary while the load is being placed. The other normally closed limit switch LS8 is shown in FIG. 20 and is provided under one of the rollers 4a in the feed conveyor 2, which roller is spring-mounted so that when a pallet is at rest on the conveyor as in the case of a jam-up, the spring 26 yields so that the limit switch LS8 is open to break the circuit and stop the motor M1. Thus switches LS7 and LS8 are safety switches that stop the motor in certain conditions. The normally open switch LS6 is adapted to start the motor M1 and hence the feed conveyor when the lift mechanism 12 is upwardly extended so that the conveyor feed is in timed relation to operation of the machine, momentary closing of the switch LS6 energizes the motor start relay R1 starting the motor M1 and closing hold switch S1. The start limit switch LS6 is shown in FIGS. 7, 8 and 24 and is operated by an arm 241 carried on the lift mechanism pinion shaft 105 and set to engage a contact roller 242 when the lift mechanism reaches its elevated position.

Included in the circuit of the main conveyor motor M2 is a normally open activating switch LS5b which is a component of limit switch control LS5 (FIGS. 7, 8 and 25) which is also operated by an element carried on the pinion shaft 105. As shown, the operating element may comprise an axial extension 244 on the sprocket 114 adapted to engage the contact roller 205 at a particular point in the lift mechanism operating cycle and particularly when the lift reaches its down position. Closing of switch LS5b energizes start relay R2 to start the motor and close hold switch S2 so that the motor M2 is operated until it is stopped by opening another, normally, closed switch LS9b. The normally closed switch LS9b is part of a limit switch control LS9 disposed along with positive feed chain drive 6 which delivers the pallets into the main conveyor 10 (FIGS. 1, 3 and 21). The switch LS9 is operated when a cam 246 on feed dog chain 6 engages a contact arm 247 on the switch assembly of the switch LS9 to stop the conveyor 6 at a point in its cycle where a feed dog is in position to engage and commence feeding the next pallet to be delivered by the feed conveyor.

The elevator drive motor M3 is operated to lift a pallet when a normally open limit switch LS1b is closed. Limit switch assembly LS1 is operated in timed sequence with the transfer fork mechanism and the pallet stacking and unstacking mechanism and for that reason is operated by an arm 249 on the stacking assembly cam shaft 225 (FIG. 26). The arm 249 is disposed relative to the contact roller 250 to close the limit switch LS1 momentarily when the transfer fork 20 is in its retracted position. Thus when the transfer fork is withdrawn the closing of limit switch LS1b energizes the relay R3 to start the elevator motor M3 and close hold switch S3. The elevator continues to rise until the motor is stopped by opening of control limit switch LS2a. As shown more specifically in FIGS. 7, 8 and 24, switch assembly LS2 is also operated by an arm 254 carried on the pinion shaft 105 of the elevator drive mechanism. The operating arm 254 is arranged relative to contact roller 255 so that switch LS2a is opened momentarily when the lift is up to break the motor circuit.

As will be noted from the wiring diagram FIG. 19 the elevator motor start relay R3 may also be energized by momentarily closing of a limit switch LS9a which is a second element of limit switch assembly LS9 seen in FIG. 21 to be operated by pallet feeding chain 6. When the switch LS9 is operated the chain has completed its cycle indicating proper placement of a pallet at the transfer table 10. Closing of switch LS9a starts the elevator cycle thus timing commencement with placement of a loaded pallet.

As shown in FIG. 26, a second limit switch assembly LS3 is operated in timed relation to the transfer fork mechanism and for that purpose is arranged to be operated on the stacking mechanism cam shaft 225. The arms 258 and 259 are disposed so as to engage contact roller 260 in both extreme positions of the transfer fork 20, i.e., when the fork is extended and when it is retracted. In both of these positions limit switch LS3b is closed to energize the relay R3' closing switch S4 to drive the elevator lift motor M3 in reverse and close hold switch 53' through the downward portion of the elevator cycle as long as control switch LS5a remains closed. Energization of relay R3' also opens control switch S5 in the forward motor circuit. Downward movement of the elevator continues until the motor M3 is stopped by opening of switch LS5a, an element of limit switch assembly LS5 which as has previously been mentioned is operated by an extension 244 on the elevator pinion shaft sprocket 114 (FIG. 25) to open switch LS5a when the elevator reaches its downward position thus stopping the elevator motor M3.

The fork driving motor M4 is under the control of a relay R4 which is energized upon closing of control switch LS2b which is an element of limit switch assembly LS2 previously discussed in connection with FIG. 24. Switch LS2b starts operation of the transfer fork 20 in timed relation to the elevator mechanism 12 since it is operated by an arm 241 on the elevator pinion shaft to close switch LS2b when the lift is in up position. This energizes the relay R4 to start the transfer fork motor M4 and close control switch S4 whereby the motor M4 runs until the limit switch LS3a is opened. This component of limit switch assembly LS3 is operated momentarily at both the in and out positions of the fork to stop the motor M4 at the end of each stroke.

Included in the pallet unstacking mechanism is a single cycle indexing clutch 162 (FIGS. 14, 27 and 28) which is released by a solenoid from a stop cam 269. As the arm 269 is pivoted a pin 270 thereon engages beneath a lock arm 272 to withdraw it from a depression in a lock cam 274. Thus, when the stop pawl or latch 268 is released it is free to drop down to the surface of the cam 269 under force of a spring 275 while the lock latch 272 rides on the higher surface of lock cam 274. When the stop pawl stops the cam 269 the lock latch drops into the depression to prevent rebound and hold the unstacking feed chain 202 in precise position for the next cycle.

As shown in the wiring diagram FIG. 19, the solenoid 266 is under the control of a relay R6 which is energized when either of two switches LS10 or LS11 is closed (FIG. 27). The switch LS10 is closed by pivotal movement of arm 312 in response to engagement by a loaded pallet moving past it and into lift position on the transfer table 10. The switch LS11 is on the cam shaft 172 of the pallet unstacking feed mechanism 30 (FIGS. 23 and 27). Specifically, switch LS11 is operated by a cam 274A and a switch-closing follower 276 so that once the feed mechanism is started the solenoid remains energized throughout the cycle of operation of the unstacking mechanism. Thus, the clutch 162 is a single-revolution clutch that is held engaged by the solenoid until another slower shaft 172 substantially completes its cycle and is then released to permit the spring of 276 to move the stop pawl 268 into active position.

In addition to the control switches described there are certain safety or shut-off controls which stop operation of the machine under certain conditions. For example, limit switch LS12 is opened by a pallet on the delivery conveyor to open the complete circuit and cut off the flow of electricity from the source 280 which circuit is otherwise completed by manual operation of a start button 282.

Also, a switch LS13 (FIGS. 14 and 22) is provided on the pallet unstacking magazine 30 so that if no pallet is present to replace that being unloaded the switch LS13 will open to break the circuit.

Method of operation

Referirng now to FIGS. 29 to 36, inclusive, the method by which the machine of this invention is operated is illustrated schematically.

Figure 33:
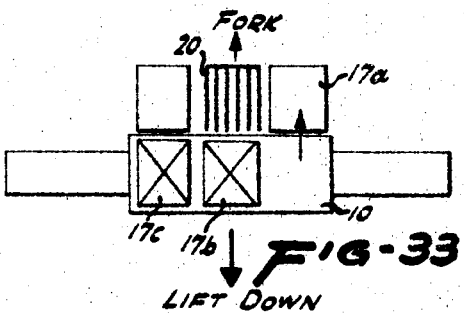
Figure 30:
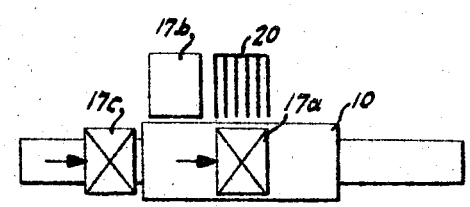
Figure 34:
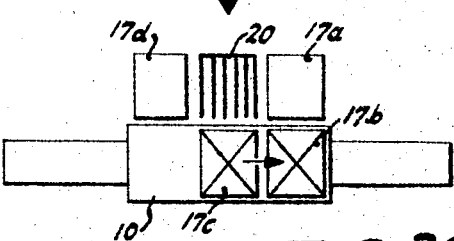
Figure 31:
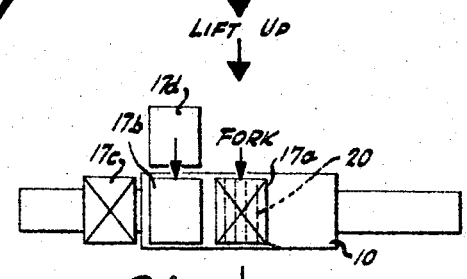
Figure 35:
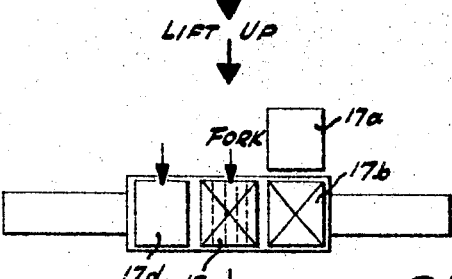
Figure 32:
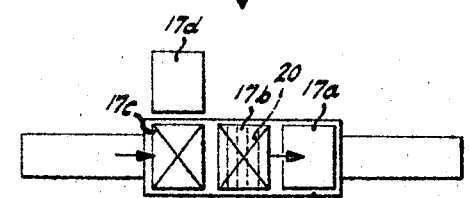
Figure 36:
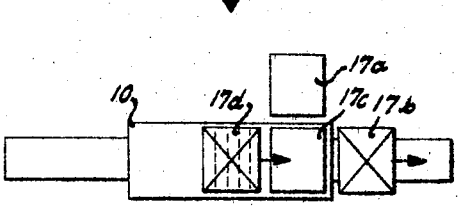

There the first incoming pallet 17a is moved along the conveyor line until it approaches the exchange station 13 followed by successively placed incoming pallets 17c. When the first incoming pallet 17a is situated at the exchange station of the main conveyor over the elevator 12, the elevator is raised and the transfer fork is extended under the load preparatory to supporting it when the elevator is subsequently lowered. Concurrently a replacement pallet 17b is moved laterally onto the section A of the main conveyor, as shown in FIG. 31. The elevator is then lowered until the transfer fork assumes the load and the original and replacement pallets are then moved along the main conveyor 10, the original pallet 17a toward section C the main conveyor and the replacement pallet under the load at the exchange station. When the replacement pallet is in place at the exchange station the elevator fingers 14 rise up through the slots provided in the pallet 17b to lift the load free thereof so that the assembly of fork tines may be withdrawn. As the fork 20 is being withdrawn the original pallet 17a is delivered laterally from section C to the stacking magazine. Then the elevator fingers are retracted down through the slots in the replacement pallet so that the load is supported thereon (FIG. 33). Finally the now-loaded replacement pallet 17b is moved to the section C at the right end of the main conveyor and another loaded incoming pallet 17c is moved onto the exchange station where the previous operation is repeated. Specifically, the elevator fingers are extended upwardly through the pallet slots to lift the load therefrom and the transfer fork assembly is extended between the elevator fingers intermediate the load and the pallet. An empty transfer pallet is moved up behind the incoming pallet, the elevator fingers are withdrawn down through the pallet slots so that the load is supported on the transfer fork and the original pallet is removed from the transfer station and the transfer pallet moved into its place. The elevator fingers 12 are again extended through the slots of the transfer pallet 17d to remove the load from the tines of the transfer fork, the transfer fork is withdrawn and the original pallet is delivered to the stacking station. The elevator fingers are then retracted down through the slots of the transfer pallet and finally the transfer pallet is moved to the discharge station.

This invention has been described in conjunction with preferred embodiments of the apparatus and a preferred method of operation. However, it is to be understood that modification and changes therein may be made by those skilled in the art without departing from the spirit and scope of this invention as defined by the claims appended hereto.

I claim:

1. In a machine for exchanging pallets whereby an exchange pallet is substituted for an incoming loaded pallet, the pallets being characterized by openings extending vertically through the same conveying means forming three aligned conveyor sections, each adapted to support a loaded pallet for movement over the same, a first one of said sections serving as an incoming conveyor for a loaded incoming pallet and also as an incoming conveyor for an exchange pallet, the second one of said sections forming a pallet exchange station, and the third one of said sections forming an outgoing conveyor for an outgoing loaded pallet and also as an outgoing conveyor for an incoming pallet, load-elevating means at the exchange station operable through said openings to elevate the load to a position spaced above an incoming pallet below the same, means operable to engage and support the load in such elevated position while the elevating means returns to a lowered position, means operable to shift the incoming pallet from a position underlying the load to the outgoing conveyor section, means operable to shift an exchange pallet onto the incoming conveyor section, means for shifting such exchange pallet from the incoming conveyor section to said exchange station, said elevating means being operable to take the load from said load supporting means and to lower the same upon the exchange pallet, and means thereafter operable to discharge the exchange pallet with the load thereon from the machine.

2. A machine as in claim 1 together with a feed conveyor aligned with said conveyor sections and serving to supply loaded incoming pallets to said incoming conveyor section.

3. A machine as in claim 1 together with a discharge conveyor aligned with the conveyor sections and operable to discharge loaded exchange pallets from the machine.

4. A machine as in claim 1 in which the means for moving exchange pallets upon the incoming conveyor section operates to move said pallets from a supply position that is to one side of said incoming conveyor section to a position upon the incoming conveyor section.

5. A machine as in claim 1 in which the means for shifting unloaded incoming pallets from the outgoing conveyor section operates to move said pallets from the outgoing conveyor section to a position that is to one side of the outgoing conveyor section.

6. A machine as in claim 4 in which pallet unstacking means operates to present the exchange pallets at a position to one side of the incoming conveyor section.

7. A machine as in claim 5 in which pallet stacking means operates to receive unloaded incoming pallets at said position that is to one side of the outgoing conveyor section.

8. A machine as in claim 1 together with stop means engageable with said pallets for accurately locating incoming and exchange pallets at said exchange station, said stop means being removable from pallet engaging position for movement of pallets to and from the exchange station.

9. In a machine for exchanging pallets whereby an exchange pallet is substituted for an incoming loaded pallet, the pallets being characterized by openings extending vertically through the same, conveyor means forming three aligned conveyor sections, each adapted to support a loaded pallet for movement over the same, a first one of said sections serving as an incoming conveyor for a loaded incoming pallet and also as an incoming conveyor for an exchange pallet, the second one of said sections forming a pallet exchange station, and the third one of said sections forming an outgoing conveyor for an outgoing loaded pallet and also as an outgoing conveyor for an incoming pallet, load-elevating means at the exchange station operable through said openings to elevate the load to a position spaced above an incoming pallet below the same, means operable to engage and support the load in such elevating position while the elevating means returns to a lowered position, means operable to shift the incoming pallet from a position underlying the load to the outgoing conveyor section, said last named means operating to move said pallets from the outgoing conveyor section to a position that is to one side of the outgoing conveyor section, means operable to shift an exchange pallet onto the incoming conveyor section, said last named means operating to move said pallets from a supply position that is to one side of the incoming conveyor section to a position upon the incoming conveyor section, means for shifting such exchange pallet from the incoming conveyor section to said exchange station, said elevating means being operable to take the load from said load-supporting means and to lower the same upon the exchange pallet, means thereafter operable to discharge the exchange pallet with the load thereon from the machine and stop means engageable with said pallets for accurately locating and exchanging pallets at said exchange station, said stop means being removable from pallet-engaging position for movement of pallets to and from the exchange station.

10. A machine as in claim 9 in which pallet unstacking means operates to present the exchange pallets at a position to one side of the incoming conveyor section, and in which pallet stacking means operates to receive unloaded incoming pallets at said position that is to one side of the outgoing conveyor section.

11. In a machine for transferring loads comprising pallets having load-supporting surfaces formed by spaced slats and a load-teamster mechanism comprising conveyor means for moving loaded and replacement pallets along a generally horizontal path, an elevator in said path to which loaded and replacement pallets are alternately fed by said conveyor means, said elevator including load-supporting fingers approximately equal in number and width to slats of a pallet spaced coincidental with the spaces between said slats, stop means moveable to pallet-engaging position for positioning a pallet on said conveyor means with the spaces between slats in vertical alignment with said fingers, means for moving said elevator between a lowered position below said conveyor and an elevated position above said conveyor, means including a transfer fork member having load-supporting tines approximately equal in number and width to slats of a pallet reciprocable generally horizontally from a retracted position to an extended position between said fingers when in their elevated positions, means for removing said stop means from said pallet-engaging position to permit said conveyor means to move said pallet when the load is supported on said tines and said elevator is in its lowered position and thereafter to restore said stop means to pallet-engaging position, lock means for holding said stop means in pallet-engaging position during movement of said elevator and means on said elevator for releasing said lock means during the last portion of the downward movement of said elevator.

12. The apparatus defined in claim 11 together with a weighing mechanism connected to and operated by said transfer fork member for weighing a load supported thereon.

13. In a machine for transferring loads comprising pallets having load-supporting surfaces formed by spaced slats and a load-teamster mechanism comprising conveyor means for moving loaded and replacement pallets along a generally horizontal path, means forming a stationary platform adapted to support a pallet thereon, a plurality of vertical passageways formed by slots extending through said platform, said passageways being configurated and spaced to conform to the size, shape and spacing of the slots in said pallets, a lift mechanism having load-supporting fingers registering with said passageways, each of said fingers having an elongated horizontal top load-supporting surface of a size and shape to conform to the passageway with which it is in registry, said fingers being sufficient in number and so spaced that the total area of the top load-supporting surfaces thereof are approximately equal to the total area of the load-supporting slats of a pallet whereby said fingers are capable of supporting a load of packages that may be supported on a pallet, a transfer fork having a plurality of tines approximately equal in number and width to the slats in a pallet, means for positioning a loaded pallet on said platform with the slots therein in registry with said passageways, first drive means for moving said lift mechanism between a retracted position wherein the top surfaces of said lift fingers do not extend above the platform and an elevated position wherein said lift fingers extend above said platform a distance in excess of the elevation of the load-supporting deck of a pallet by an amount sufficient to permit the insertion of the tines of said transfer fork vertically intermediate said top surfaces and said load-supporting slats, and second drive means for extending said transfer forks horizontally between a retracted position out of alignment with said platform and an extended position overlying said platform.

14. The combination defined by claim 13 together with means for operating said first and second drive means in timed sequence when a loaded first pallet is on said platform so that a cycle of operation is carried out in which the lift mechanism is operated to raise the lift fingers through the slots of said first pallet to elevate the load thereon above the pallet, the transfer fork is extended between the lift fingers and the load-supporting surface of the pallet, the lift fingers are retracted back through the slots of said first pallet to its retracted position and there positioned for a period of delay, thereafter the lift mechanism is extended to its elevated position, the transfer mechanism is retracted, and then the lift mechanism is lowered to its retracted position, and means for replacing said first pallet with a second unloaded pallet during said period of delay.

15. The combination defined in claim 14 together with positioning means engageable with the side of a pallet to define a position wherein slots therein are aligned with said passageways, and wherein said pallet replacing means comprises means for removing said positioning means from below the plane of said platform, conveyor means for removing said first pallet and introducing a second pallet onto said platform, and means for replacing said positioning means above the plane of said platform into the path of said second pallet.

16. The combination defined by claim 13 including scale means connected to and operated by said transfer fork for weighing a load supported thereon free of a pallet.

17. Apparatus for transferring loads comprising a load transfer mechanism and portable pallets, each of said pallets including a plurality of spaced, generally parallel slats forming a load-supporting surface with alternating slats and slots across said surface, said load transfer mechanism comprising a conveyor for moving pallets along a generally horizontal path, said conveyor including generally parallel rollers of a diameter approximately equal to the width of a pallet slat spaced according to the spacing of said slats, a lift elevator including load-supporting fingers, normally positioned below said conveyor but being movable upwardly between said rollers to an elevated position above said conveyor, said fingers having elongated top surfaces that fit closely within the slots of a pallet, said fingers being sufficient in number and so spaced that the total area thereof is approximately equal to the total area of the slats of a pallet, stop means movable into the path of a pallet moving along said conveyor to engage and position said pallet on said conveyor with the slats thereof in vertical alignment with said rollers and said slots in registry with the spaces between the rollers, a transfer fork member having load-supporting tines approximately equal in number and width to the number and width of the slats of a pallet reciprocable in a generally horizontal plane intermediate the load-supporting slats of a pallet on said conveyor and the elevated position of said lift elevator fingers from a retracted position displaced from said conveyor to an extended position overlying it, the tines of said fork member being in vertical registry with rollers in said conveyor so that they extend between fingers of said lift elevator when in their elevated positions, and first drive means operable after a pallet is positioned on said conveyor means for raising said elevator to said elevated position and then retracting it through two cycles, and second drive means operable when said elevator is in said elevated position to extend said transfer fork during the first cycle and to retract said transfer fork during the second cycle.

18. The apparatus defined in claim 17 including a weighing mechanism connected to and operated by one of said fork members and lift elevator for weighing a load supported thereon free of a pallet.

19. Apparatus defined in claim 17 including means actuated in response to lowering of said elevator to move said stop means out of the path of said pallet to permit removal thereof by said conveyor, then to move said stop means back in pallet-engaging position before a second pallet is delivered by said conveyor.

References Cited by the Examiner
UNITED STATES PATENTS

| | | |
|---|---|---|
| 2,176,307 | 10/1939 | Lamb. |
| 2,509,682 | 5/1950 | Golrick _____ 214—38.46 X |
| 2,639,050 | 5/1953 | Hoffmann _____ 214—310 |
| 2,774,489 | 12/1956 | Guigas. |
| 2,792,950 | 5/1957 | Fenton _____ 214—6.2 |
| 2,858,043 | 10/1958 | Fenton _____ 214—8.5 |
| 2,947,405 | 8/1960 | Fenton. |
| 3,038,615 | 6/1962 | Roth _____ 214—8.5 |
| 3,082,884 | 3/1963 | Culpepper _____ 214—2 |

FOREIGN PATENTS

| | | |
|---|---|---|
| 1,061,502 | 7/1959 | Germany. |
| 659,226 | 10/1951 | Great Britain. |

MARVIN A. CHAMPION, *Primary Examiner.*

MORRIS TEMIN, *Examiner.*